United States Patent [19]

Squires et al.

[11] Patent Number: 5,293,282

[45] Date of Patent: Mar. 8, 1994

[54] MULTIPLE ACTUATOR DISK DRIVE

[75] Inventors: John P. Squires, Boulder; Glade N. Bagnell; Charles M. Sander, both of Longmont; Kurt M. Anderson, Louisville, all of Colo.

[73] Assignee: Conner Peripherals, Inc., San Jose, Calif.

[21] Appl. No.: 614,853

[22] Filed: Nov. 9, 1990

Related U.S. Application Data

[63] Continuation-in-part of Ser. No. 431,575, Nov. 3, 1989, Pat. No. 5,223,993.

[51] Int. Cl.$^5$ .............................................. G11B 5/596
[52] U.S. Cl. .................................. 360/77.08; 360/78.04; 360/98.01; 360/97.03; 360/902; 360/903
[58] Field of Search ................. 360/48, 77.02–77.11, 360/78.04–78.15, 97.01–97.03, 98.01, 98.02, 98.07, 105, 106, 61, 63, 75, 902, 903

[56] References Cited

U.S. PATENT DOCUMENTS

| | | | |
|---|---|---|---|
| 4,270,154 | 5/1981 | Crawford | 360/63 |
| 4,881,139 | 11/1989 | Hazebrouck | 360/105 |
| 4,890,174 | 12/1989 | Chalmers et al. | 360/78.12 |
| 4,914,369 | 4/1990 | Cordovi | 360/78.13 |
| 5,081,552 | 1/1992 | Glaser et al. | 360/98.01 |

OTHER PUBLICATIONS

Electronic Engineering Times "Winchester Disk Drives" Issue 318, Feb. 25, 1985, pp. 53,56,58–60,62,63,65, Clemens.

Primary Examiner—Jerry Smith
Assistant Examiner—Steven R. Garland
Attorney, Agent, or Firm—Fliesler, Dubb, Meyer & Lovejoy

[57] ABSTRACT

A multiple actuator disk drive utilizes multiple heads, associated with respective ones of multiple actuators, to read data from and write data to all tracks on the surface of a disk. The positioning of each head by the respective actuator is controlled by embedded servo-information recorded in the data tracks. The data tracks have a density of greater than 2000 tracks per inch. Utilizing two actuators provides access times which are reduced with respect to the access times provided by disk drives having a single actuator and an increased data transfer rate.

7 Claims, 6 Drawing Sheets

MULTIPLE ACTUATOR DISK DRIVE

CONTINUING APPLICATION DATA

This application is a Continuation-In-Part of application Ser. No. 07/431,575, now U.S. Pat. No. 5,223,993 filed Nov. 3, 1989, inventors John P. Squires, Glade N. Bagnell, Charles M. Sander and Kurt M. Anderson, assigned to the assignee of the instant application.

CROSS-REFERENCE TO RELATED APPLICATIONS

MULTIPLE MICROCONTROLLER HARD DISK DRIVE CONTROL ARCHITECTURE, Ser. No. 07/611,141, filed Nov. 9, 1990, assigned to the assignee of the present invention.

DISK DRIVE SYSTEM CONTROLLER ARCHITECTURE, Ser. No. 057,289, filed Jun. 2, 1987, now U.S. Pat. No. 4,979,056, issued Dec. 18, 1990 assigned to the assignee of the present application;

DISK DRIVE SOFTWARE SYSTEM ARCHITECTURE, Ser. No. 07/790/008, filed Nov. 4, 1991, which is a continuation of Ser. No. 07/488,386, filed Feb. 23, 1990, which is a continuation of Ser. No. 057,806, filed Jun. 2, 1987, are assigned to the assignee of the present application;

LOW-POWER, HARD DISK DRIVE SYSTEM ARCHITECTURE, Ser. No. 07/564,693, which is a continuation of Ser. No. 152,069, filed Feb. 4, 1987, assigned to the assignee of the present application;

MAGNETIC PARKING DEVICE FOR DISK DRIVE, Ser. No. 07/909,149, filed Jul. 6, 1992, which is a continuation of Ser. No. 07/643,703, Filed Jan. 22, 1991, which is a continuation of Ser. No. 269,873, filed Nov. 10, 1988, are assigned to the assignee of the present application; and DISK DRIVE SYSTEM USING MULTIPLE EMBEDDED QUADRATURE SERVO FIELDS, Ser. No. 07/860,299, which is a continuation of Ser. No. 07/780,443, which is a continuation of Ser. No. 386,504, filed Jul. 27, 1989, assigned to the assignee of the present application;

ADAPTIVE READ EQUALIZER WITH SHUT-OFF MODE FOR DISK DRIVES, Ser. No. 559,899, filed Jul. 30, 1990, assigned to the assignee of the present application;

DISK DRIVE SYSTEM EMPLOYING ADAPTIVE RE-AD/WRITE CHANNEL CONTROLS AND METHOD OF USING SAME, Ser. No. 07/784,655, filed Oct. 28, 1991, which is a continuation of now U.S. Pat. No. 5,121,262, issued Jun. 9, 1992 Ser. No. 420,371, filed Oct. 12, 1989, assigned to the assignee of the present application;

MULTIPLE ACTUATOR DISK DRIVE, Ser. No. 431,575, filed Nov. 3, 1989, assigned to the assignee of the present application; and HIGH PERFORMANCE DISK DRIVE ARCHITECTURE, Ser. No. 07/612,427, filed Nov. 9, 1990, assigned to the assignee of the present application.

Each of these Related Applications is hereby incorporated by reference.

BACKGROUND OF THE INVENTION

1. Field of the Invention

The present invention relates to disk drives; more particularly, to high performance disk drives having multiple actuators.

2. Description of the Related Art

Conventional disk drives for use in work stations, personal computers, portable computers, and lap top computers, utilize a single actuator to position a single head with respect to each disk surface. Such disk drives often incorporate a plurality of disks organized in a stack, and a plurality of heads associated with corresponding ones of the disk surfaces. All of the heads are supported and positioned by the single actuator. During operation, only a single head reads or writes information from or to each disk surface.

Greater demands are being placed on disk drives by (1) the use of multi-user and/or multi-tasking operating systems, (2) work stations which provide an operating environment requiring the transfer of large amounts of data to and from a hard disk and/or large numbers of disk accesses to support large application programs or multiple users, and (3) the continuing trend toward higher performance microprocessors. The demands on disk drives include higher data transfer rates along with greater access to data.

To satisfy these demands, it has become desirable to increase the performance of hard disk drives beyond the performance levels which can be achieved by reducing access times of single actuator disk drives. (The access time of a disk drive is conventionally known as the average seek time determined by dividing the total time required to seek between all possible ordered pairs of track addressed by the total number of ordered pairs addressed.) Although access times are one factor which determines drive performance, other factors, including the data transfer rate (both to and from the media and to and from the internal buffer of a disk drive), the overhead imposed by the electronics of the disk drive, and the average latency time, all effect the performance of a disk drive.

Conventional disk drives having a single actuator provide performance levels limited by the following factors: (1) Only one track on any one data surface can be accessed at a given time; as a corollary, considering all of the heads, only one cylinder can be accessed at a given time (a cylinder is a vertically oriented segment representing the same track on the surfaces of all of the disks). (2) It is difficult, if not impossible, to simultaneously operate any two heads mounted on a single actuator. (3) In a multi-user or multi-tasking environment one process which is a disk intensive activity substantially reduces the ability of any other process to access data.

One conventional approach to enhancing access to data is to construct a disk drive using the so-called "head-per-track" approach, where one head is dedicated to each track on each disk surface. This approach is not practical for large track densities (on the order of 1,000 or more tracks per inch) where thousands of heads would be required for each disk surface. In the environment of a work station, personal computer, or portable computer, the electronics required to operate such a large number of heads and the space required for the structural components necessary to support these heads would make it unfeasible to employ the head-per-track approach.

Another conventional approach to enhancing access to data divides the cylinders into multiple zones and utilizes multiple actuators and multiple heads per surface. For a given surface, each actuator positions one head only with respect to one of the multiple zones. One example of this approach is illustrated in U.S. Pat. No.

4,577,240. The multi-zone approach is equivalent to providing two separate logical disk drives which can not access each other's data, and does not enhance performance for any one zone of the disk drive.

The multi-zone approach is dictated in part by the use of actuators which support multiple heads in a vertical line which defines a cylinder, each head being associated with a corresponding one of the data surfaces of the disk drive. Because it is generally faster to electronically switch the head which is active than to perform a seek to a new track, the storage area of a disk drive is filled by cylinder. During the recording process, the actuator positions the heads at a selected cylinder and all of the tracks associated with the selected cylinder are filled with data by performing head switches. Then, a seek is performed and data is recorded in the next selected cylinder. The track densities currently in use are such that two sets of heads can not be aligned to have all heads on track for all tracks in a cylinder. This mechanical misalignment presents the same problems as mechanical off-tracking in a single actuator disk drive. Accordingly, a cylinder formatted by one group of heads can not be efficiently used by another group of heads.

A variation on the multiple zone approach is disclosed in the U.S. Pat. Nos. 4,318,145, 4,331,990, and 4,423,448. These patents disclose disk drives having multiple actuator modules, each actuator module having multiple actuators. The actuator modules are arranged so that the head supported and positioned by each actuator primarily services a selected group of tracks and services a second group of tracks as a backup. Any particular track is capable of being serviced by at least two heads The back-up feature is used in the event that the primary head is inoperative, or to optimize data access by utilizing the back-up head to service some of the tracks which the primary head is intended to service while the primary head is occupied reading data from other tracks. The lack of positioning control between the actuators in the various actuator modules and the imprecise positioning of the heads provided by the linear actuators utilized in this approach makes it difficult if not impossible to provide a high data density or a high performance disk drive suitable for the environment of a work station, personal computer, portable computer, or lap top computer.

SUMMARY OF THE INVENTION

It is, therefore, an object of the present invention to provide a disk drive having enhanced data access capabilities.

A further object of the present invention is to provide a disk drive having an increased data transfer rate.

Another object of the present invention is to provide a multiple actuator disk drive having a form factor suitable for use in work stations, desk top computers, or personal computers.

Another object of the present invention is to provide a multiple actuator disk drive in which at least two groups of heads positioned by separate actuators are able to efficiently access the same data tracks.

Another object of the present invention is to provide a multiple actuator disk drive which is capable of simultaneously reading data from a selected track with two or more heads.

Another object of the present invention is to provide a multiple actuator disk drive which is capable of reading data from two different tracks using two actuators independently.

These and other objects of the present invention are accomplished by a multiple actuator disk drive in which at least two heads, supported and positioned by respective actuators, read data from and write data to at least one common track on the surface of a disk, with the positioning of each head by the respective actuators being controlled by embedded servo-information. In the preferred embodiment a disk drive having five disks, each disk having data track with a track density of approximately 2300-2400 tpi, two actuators, and a half height 5¼" form factor has a 500 Mb data capacity, an approximately 8.5 msec access time when using the actuators in concert and as low as 6 msec when using the actuators independently. The disk drive may use a horizontal data structure in which data is recorded sequentially on all of the tracks of one data surface before data is recorded on the next data surface. The horizontal data structure eliminates the problems associated with mechanical off-tracking and allows two or more groups of heads to more efficiently read data than if the tracks were aligned in cylinders. A disk drive in accordance with the present invention comprises a flat base and a cover attached to said base to create a controlled environment between said base and said cover. Further, a plurality of disks is provided in a disk stack, each disk having first and second data storage surfaces, each data storage surface having a plurality of concentric tracks for storing data and servo information. A spindle motor is provided for rotating said disks, said spindle motor being attached to said base and to said top plate. A plurality of transducer means for reading data and embedded servo information from and recording data on respective ones of said disks are provided on two actuators mounted on said base, said actuators supporting respective ones of said transducers adjacent to respective ones of the first and second data storage surfaces of each of said disks. Further, a cover plate, attached to said base and said actuators, surrounds said disk stack. Control means, responsive to the servo information, is provided for controlling said actuators to position said transducers with respect to said disks so that each transducer reads and records data on all of the concentric tracks of the data storage surface with which the transducer is associated.

DESCRIPTION OF THE PREFERRED EMBODIMENTS

A multiple actuator disk drive according to the present invention will be described with reference to FIGS. 1-8. The disk drive described herein includes, for example, five (5) hard disks with a magnetic coating, utilizes Winchester technology, and two heads per disk surface (four heads per disk); however, the disk drive may utilize various numbers of disks, various numbers of heads per disk surface, and other types of disks, for example, optical disks, and other read/write technologies, for example, lasers.

The form factor selected for the disk drive of the present invention is a half-height, five and one-quarter inch ($5\frac{1}{4}$") form factor in which the length of the disk drive is approximately 8", the width is approximately 5.75", and the height is approximately 1.625". The disks utilized in the disk drive of the present invention have a diameter on the order of 3.75 inches, so-called "$3\frac{1}{2}$ inch" disks. The $3\frac{1}{2}$" disks provide the physical space necessary for multiple actuators in a $5\frac{1}{4}$" form factor disk drive; however, the disk drive of the present invention can be used with disks having diameters larger or smaller than 3.75 inches, and form factors other than $5\frac{1}{4}$". For example, a $3\frac{1}{2}$" form factor multiple actuator disk drive in accordance with the present invention may be constructed using disks having a diameter of approximately $2\frac{1}{2}$".

Figure 1:
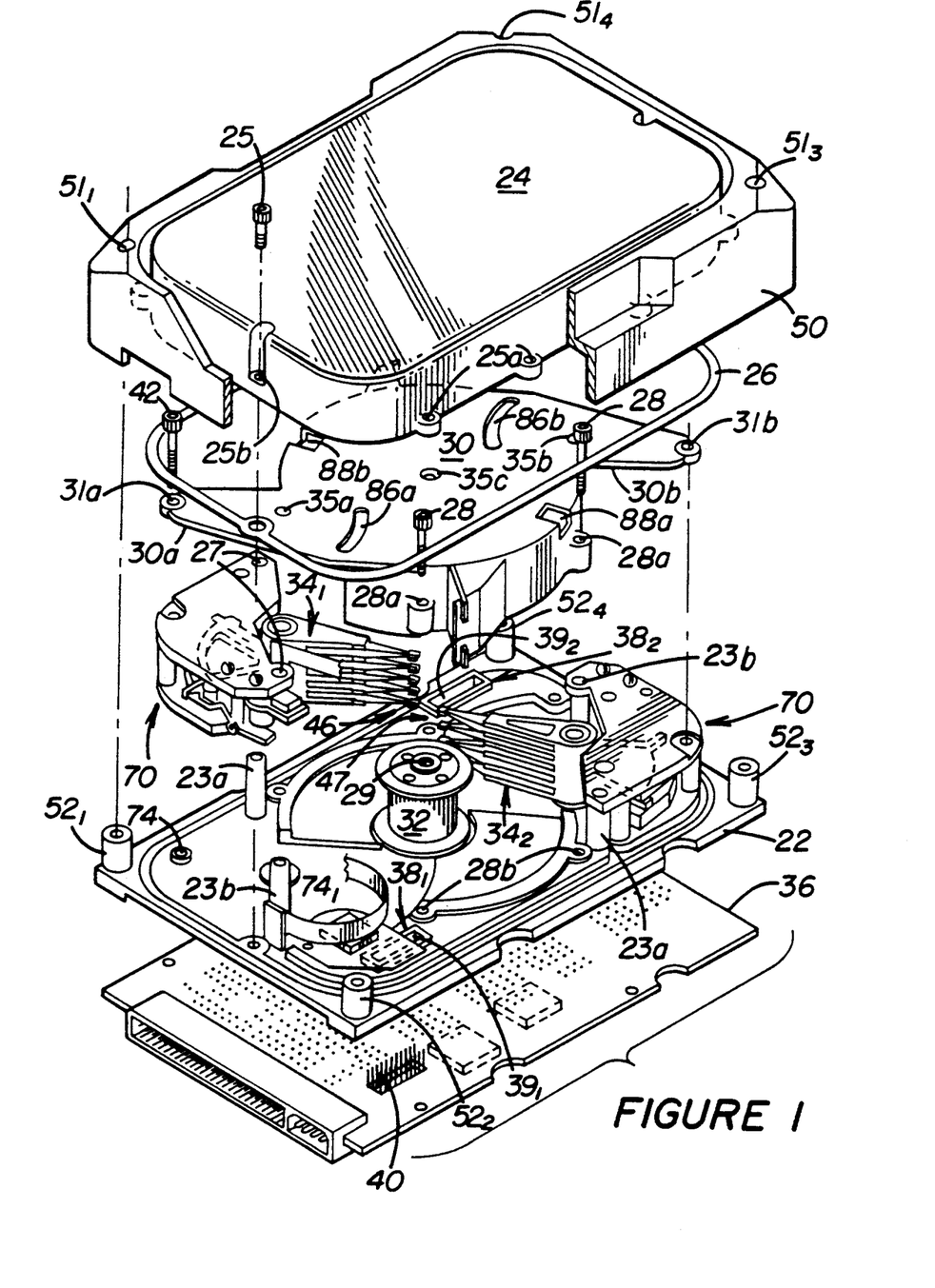
FIG. 1 is an exploded, isometric view of a multiple actuator disk drive in accordance with the present invention.
Figure 2:
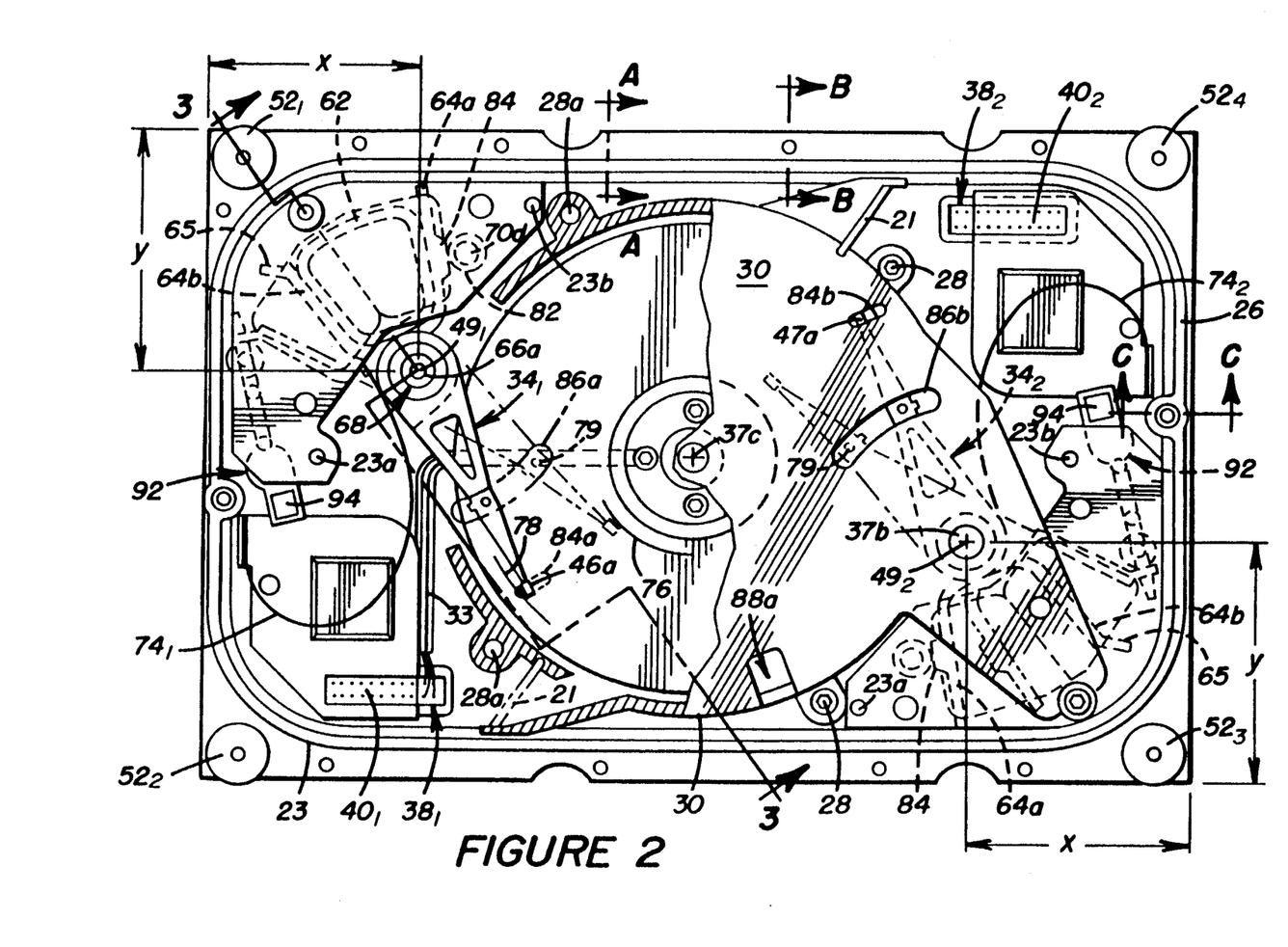
FIG. 2 is a plan view of a multiple actuator disk drive in accordance with the present invention.
Figure 2A:
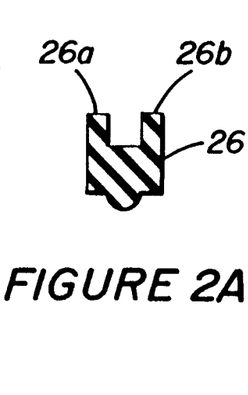
FIG. 2A is a cross-sectional view along Line A—A in FIG. 2 of the gasket utilized in accordance with the disk drive of the present invention.
Figure 2B:
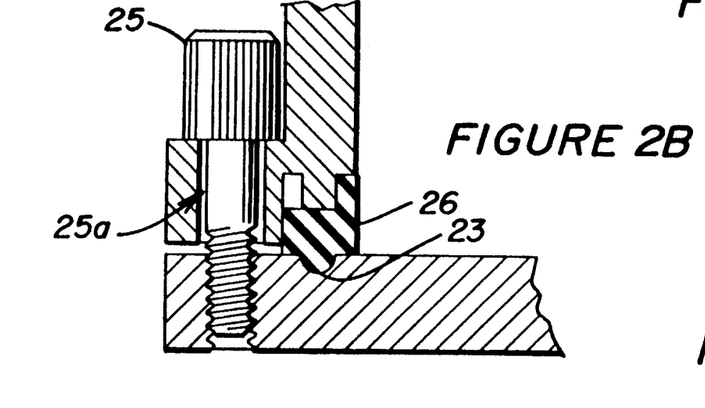
FIG. 2B is a cross-sectional view along Line B—B in FIG. 2 of a portion of the cover, gasket and screw mounting in accordance with the disk drive of the present invention.
Figure 2C:
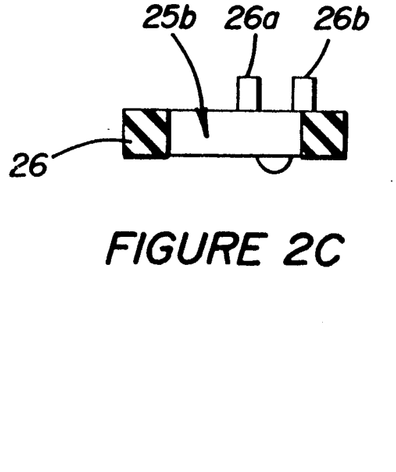
FIG. 2C is a cross-sectional view of the cover along line C—C in FIG. 2 of a portion of the cover, gasket and screw mounting in accordance with the disk drive of the present invention.
Figure 3:
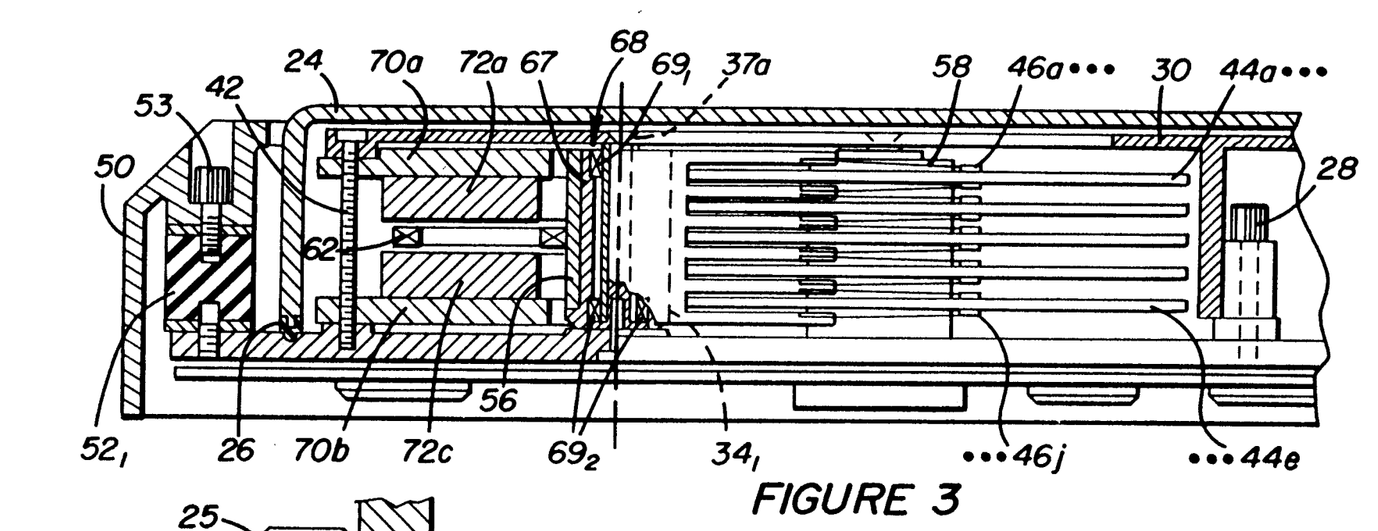
FIG. 3 is a cross-sectional view, along line 3—3 in FIG. 2.

With reference to FIGS. 1-3, a disk drive 20 in accordance with the present invention includes a base 22 and a cover 24. A gasket 26 is provided between base 22 and cover 24 to establish a sealed (or controlled) environment between base 22 and cover 24. Gasket 26 is seated in a trench 23 in base plate in a tongue and groove fashion. Gasket 26 includes walls 26a–b which allow cover 24 to be seated in gasket 23 in a tongue and groove fashion. (See FIGS. 2A–2C.) At points where gasket 26 encounters bores 25a, outer wall 26a is eliminated with no loss of environmental integrity, as shown in FIG. 2B. At points where gasket 26 encounters bores 25b, gasket 26 is extended to surround the entire bore as detailed in FIG. 2C. Disk drive 20 does not utilize a breather filter, and the seal provided by gasket 26 isolates the sealed environment from ambient atmospheric conditions. The seal provided by gasket 26 is stable at pressures experienced at altitudes from 200 feet below sea level to 10,000 feet above sea level during operation of the disk drive. Two internal air filters 21 each having 0.3 micron filter media are provided in the internal air flow to maintain a clean environment.

A spin motor 32, which supports and rotates disks 44a–e, and first and second actuators $34_1$, $34_2$ are mounted on base 22. Spin motor 32 includes a tapped hole 29 to allow cover plate 30 to be secured to spin motor 32. Top plate 30 maintains the relative positions of the rotational axes of spin motor 32 and first and second actuators $34_{1-2}$. Base 22 and cover 24, along with the components contained therein, comprise a head-disk assembly (HDA).

Disk drive 20 comprises the HDA along with a printed circuit board 36 and a shock frame 50. Printed circuit board (PCB) 36 has circuitry for operating the disk drive; in particular, the circuits provided on PCB 36 create control signals which control the operation of spin motor 32, first and second actuators $34_{1-2}$, and which handle the transfer of data to and from disks 44a–e. PCB 36 is mounted to base 22 and grounded to the HDA. First and second header assemblies $38_{1-2}$, each comprising a bore $39_{1-2}$ in base 22 and pin assembly $40_{1-2}$ potted (sealed) in bores $39_{1-2}$ in base 22. Pin assemblies $40_{1-2}$ press fit into holes in PCB 36 to transfer control signals from PCB 36 to the controlled environment between base 22 and cover 24.

Shock frame 50 and base 22 are attached by shock mounts $52_{1-4}$. Screws 53 pass through bores $5_{1-4}$ of shook frame 50 and are threaded into mounts $52_{1-4}$ to attach shock frame 50 to mounts $52_{1-4}$ and base 22, respectively. Shook mounts $52_{1-4}$ are threaded directly into base 22, as shown in FIG. 3. Disk drive 20 may be mounted in a host computer (not shown) or other supporting structure by screws (not shown) mounting in bores (not shown) in shook frame 50. Shock frame 50 surrounds the HDA and PCB 36, and has dimensions which provide the overall half height $5\frac{1}{4}$" form factor package size.

In general, base 22 is provided with a flat top surface for conveniently mounting the components of the disk drive thereon during the manufacturing process. Such a "flat base plate" is not completely planar, some mounting pads and wells, as well as cast structures are necessary to mount drive components on the base. However, in general the majority of the top surface of the base is left free of structure to provide ease in assembling the drive. This type of base significantly increases the speed with which the drives can be manufactured over conventional drives using a base having the so-called "bathtub" design. A base having the bathtub design requires that elements being mounted to the base and the tools used to mount the elements must all fit within the walls of the bathtub, making it difficult to locate an element and later rotate the element into position.

Structural rigidity may sometimes be a problem in drives utilizing so-called flat baseplate designs. Torques created by actuator movement, spin motor and disk rotation in such disk drives can cause a number of divergent forces which can warp the structure of the drive housing causing data seek and off-tracking errors.

Notably, cover plate 30 includes first and second arms 30a–b extending from the cylindrical main portion of cover plate 30 outward toward actuators $34_1$ and $34_2$, respectively. Bores 31a–b are provided for affixing cover plate 30 to base 22. Elongated hex screws 42 are provided through bores 71a in top plates 70a and bores 71b in bottom plates 70b to tapped holes 75 in base 22, thereby securing motor housings 70 of respective actuators $34_{1-2}$, and cover plate 30, to base 22. Additionally, bores 35a–b are provided for allowing threaded screws 37a–b to couple into bores 66a in actuator shaft 66; bore 35c is provided to allow screw 37c to couple cover plate 30 to tapped hole 29 and spin motor 32. Thus cover plate 30 provides a diagonally oriented structural support for base 22 to prohibit warping of the disk drive along the diagonal line having opposite ends at actuators $34_1$ and $34_2$.

Cover plate 30 is also secured to base 22 by threaded hex screws 28 extending through bores 28a in cover plate 30 into tapped holes 28b in base 22. Motor housings 70 are mounted to base 22 by machine screws (not shown) provided through bores 27 in top plates 70a to threaded bores in support posts 23a-b mounted in base 22, providing further structural rigidity to drive 20.

Cover 24 is secured to base 22 by a plurality of cover screws 25 extending through bores 25a and secured into tapped holes on base 22. Shock frame 25 extends to a height whereby the walls of shock frame 25 surround PCB 36. Shock frame 25 is provided to shield the HDA from operational shocks which may be encountered by the host computer and imparted to disk drive 20.

The above-described basic structure of disk drive 20 provides excellent protection from shock and vibration. In particular, disk drive 20 will withstand nonoperating shocks of 50 g's and operating shocks, without nonrecoverable errors, of 10 g's. Nonoperating vibration of 4.0 g's in the range of 5–500 Hz is the specified tolerable limit. Operating vibration, without nonrecoverable data, is specified at 0.5 g's for the range of 5–500 Hz.

As shown in FIGS. 2 and 3, the components in the controlled environment include five disks 44a-e (each having two data surfaces), and two groups of transducers (or heads) 46, 47, each group including ten transducers 46a-j, 47a-j. The first group of transducers 46 are supported and positioned by first actuator assembly $34_1$, and the second group of transducers 47 are supported and positioned by second actuator assembly $34_2$. One transducer from each of the first and second groups of transducers 46, 47 write data on, and read data and servo information from, corresponding respective ones of first and second surfaces of each of disks 44a-e. Because disk drive 20 utilizes embedded servo information it is not necessary to provide a data surface having dedicated servo information. Further, providing two transducers per data surface doubles the data transfer rate with respect to single actuator disk drives.

First and second actuator assemblies $34_{1-2}$ perform the function of positioning respective groups of heads 46, 47 with respect to disks 44a-e. As shown in FIG. 2, actuator assemblies 34-2 are positioned so that they are 180° apart with respect to disks 44a-e. This positioning is optimal if the desired use of actuators $34_{1-2}$ is to simultaneously read or write data to a particular data track. It ill be understood by one skilled in the art that actuators $34_{1-2}$ need not be positioned 180° apart when actuators $34_{1-2}$ are operating independently. Further, the azimuthal angles for each of the actuator assemblies $34_{1-2}$ are matched as closely as possible so that each group of heads 46, 47 will have the same relative position with respect to each data track, as discussed more fully below. Heads 46a-j and 47a-j may be, for example, thin-film heads or metal-in-gap heads.

Positioning actuator assemblies 180° apart makes the average latency time during simultaneous operation of actuators $34_{1-2}$ one quarter of a revolution, as opposed to one half of a revolution for a single actuator drive. In such operation, as disk drive 20 receives a request to read data from a particular sector of a particular track, the control circuitry on pCB 36 determines which one of actuator assemblies $34_{1-2}$ will read the data based on factors including the actuator having the shorter latency time and the actuator having the shorter seek to the track.

Figure 4:
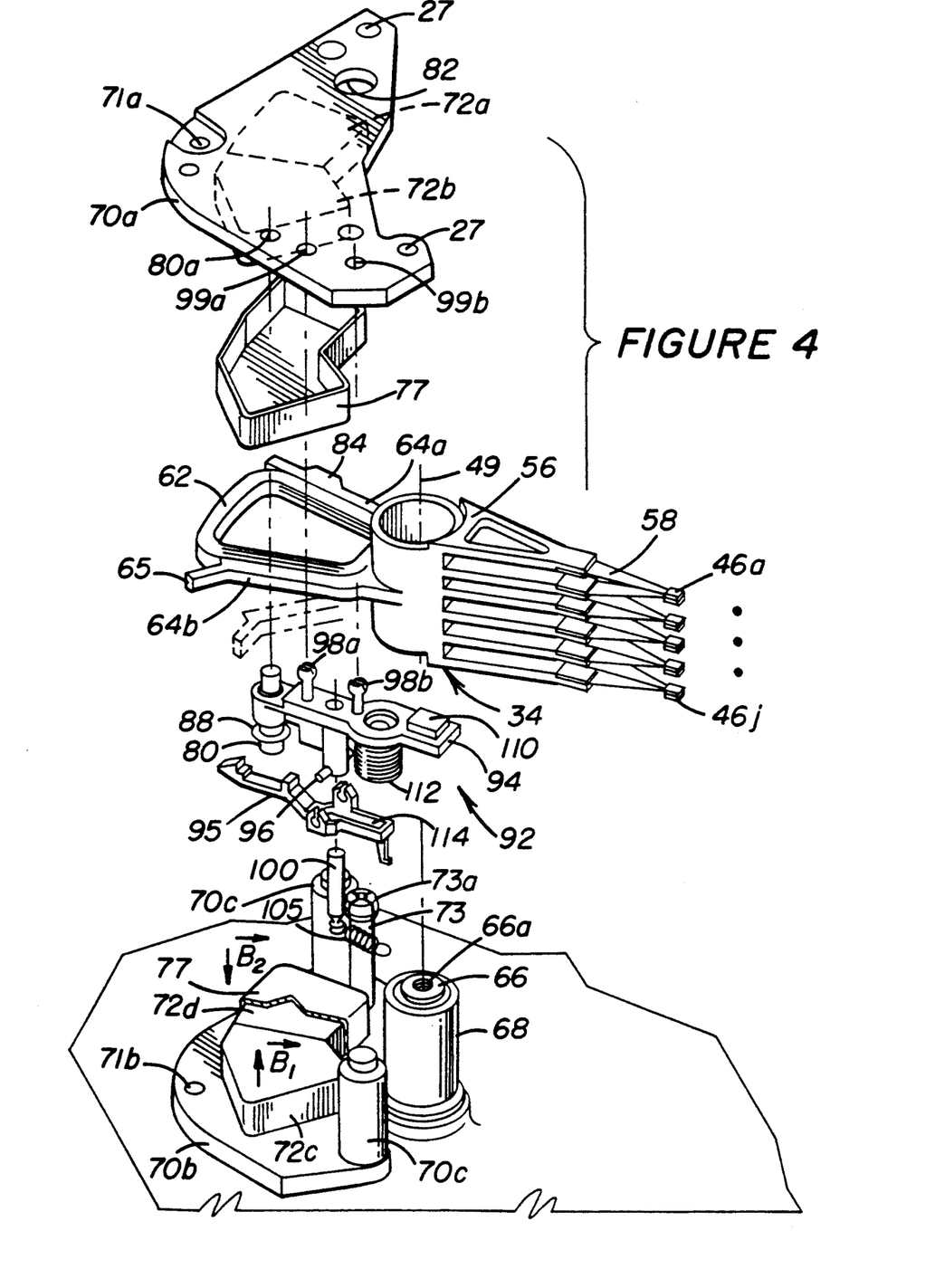
FIG. 4 is an exploded, isometric view of an actuator assembly for a multiple actuator disk drive in accordance with the present invention.
Figure 5:
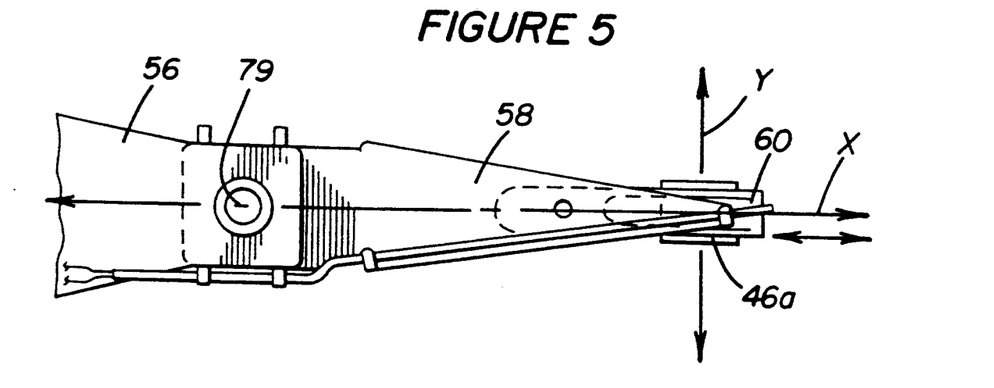
FIG. 5 is a partial, plan view of an actuator arm.
Figure 6:
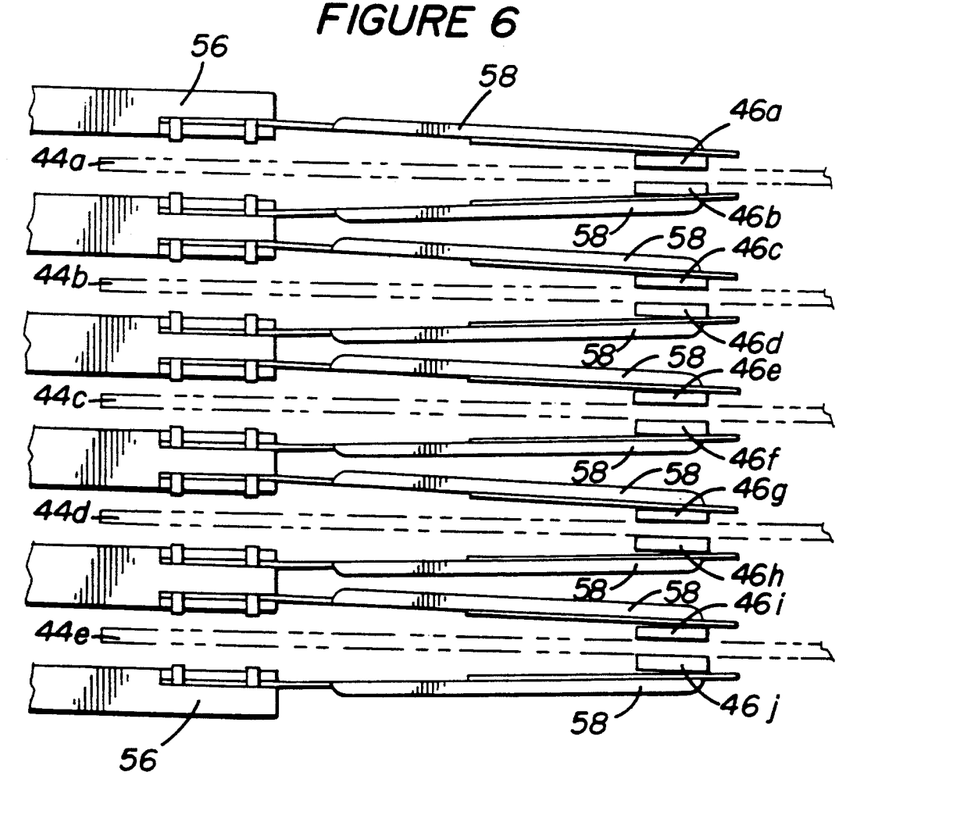
FIG. 6 is a partial, side view of a group of actuator arms.

As shown in FIGS. 3–4, each actuator assembly $34_{1-2}$ includes an actuator body 56 and ten load beams 58 which are connected to respective ones of heads 46a-j by flexures 60. An actuator coil 62 is mounted on actuator body sub-arms 64a-b. Each actuator body 56 is mounted on a shaft 66 by a bearing cartridge 68. Shaft 66 is pressed into base 22 and thus screws 37a-b, when provided through cover plate 30, engage tapped holes 66a-b respectively in post 66, and bearing cartridge 68 is securely clamped in drive 20. Cartridge 68 includes first and second bearings $69_{1-2}$ surrounded by sleeve 67. Body 56 is slidably mounted on sleeve 67 and secured by a snap ring (not shown) to bearing cartridge 68. A bore 67a is provided in shaft 66 to allow cover plate 30 to be secured thereto. Each shaft 66 is attached to base 22 and cover plate 30. Actuator body 56, including all of the components attached thereto, is precisely balanced, i.e., equal amounts of weight are provided on either side of the pivot point (center axis 49 of shaft 66) so that the pivoting of actuator body 56 to position heads 46, 47 is less susceptible to linear shock and vibration.

In order to write data to and read data from the same tracks using two (or more) heads, it is necessary to closely match the skew angles of the heads with respect to the x-axis of each actuator 34. The thin film and metal-in-gap heads contemplated for use in disk drive 20 interact with disks 44 by way of a gap which is parallel with the slider body of the head. Aligning the slider body of each head with the centerline axis x (FIG. 5) of actuator body 56 provides the heads in each group of heads 46, 47 with closely matched azimuthal angles, and hence closely matched skew angles. The tolerance for the skew angle of each head with respect to axis x is ±0.5°, and the worst case azimuthal difference between any two heads is 1.0°. To match the azimuthal angles of the first and second groups of heads, the rotational axis of each actuator assembly $34_{1-2}$ is located at the same radius with respect to the rotational axis of disks 44; the positioning of these rotational axes is performed with a tolerance of approximately 0.006–0.008 inches. In addition, each suspension 58 and head 46 must be precisely aligned when mounted to actuator body 56. Conventionally, the bond between suspension 58 and body 56 is mechanically aligned. Subsequent to the mechanical alignment, a laser is provided along the y-axis (FIG. 5) and on to the gap of head 46, which is parallel to the y-axis. This allows one to precisely measure the degree to which the alignment varies off the preferred alignment of 90° with respect to the x-axis. Variances can be aligned to within 0.3°. The rigid mechanical structure provided by base 22 and cover plate 30 maintains the precise three-dimensional alignment of actuator assemblies $34_{1-2}$ for all operating conditions.

The force for pivoting each actuator body 56 is provided by a voice coil motor including coil 62 and an actuator motor including housing 70 having top and bottom plates 70a-b, and magnets 72. Top plate 70a and bottom plate 70b are attached by spacers 70c-e. Top plate 70a is attached to base 22. Magnets 72a,b are attached to top plate 70a, and magnets 72c,d are attached to bottom plate 70b. Top and bottom plates 70a-b provide returns for the magnetic fields generated by magnets 72a-d. Magnets 70a-d are arranged to provide first and second magnetic fields $\vec{B}_1$, $\vec{B}_2$ the air gaps between respective ones of magnets 72a and 72c and magnets 72b and 72d. First and second magnetic fields $\vec{B}_1$, $\vec{B}_2$, are encompassed in closed magnetic field loops including top and bottom plates 70a-b, magnets 72a-d, and the air gaps. By containing magnetic fields $\vec{B}_1$ and $\vec{B}_2$ in returns, the magnetic field intensity of each field is increased in the air gaps. The strength of the magnetic field in these air gaps is directly related to the torque which the voice coil motor exerts on the actuator body 56 and thus the rotational velocity of actuator body 56 and the seek times for the drive.

The motor housing 70 and actuator coil 62 are arranged so that a current in coil 62, in the presence of the magnetic fields created by magnets 72a–d creates a force which pivots actuator body 56. Currents passing in opposite directions in coil 62 create torques in opposite directions and pivot actuator body 56 to position heads 46, 47 at selected locations with respect to disks 44a–e.

To protect disks 44 from particles potentially released from magnets 72, magnet shields 77 (FIGS. 4 and 7) are provided over each pair of magnets 72a–b and 72c–d. Magnet shields 77 are formed of non magnetically permeable material, for example, plastic or stamped 300 Series stainless steel. Magnets 72 are glued to the inside of magnet shields 77 and then the exposed surface of magnets 72 is glued to the appropriate top or bottom plate 70a–b. Magnet shield 77 is then sealed to top or bottom plate 70a–b with an adhesive. Each motor housing 70 is mounted to base 22 by machine screws (not shown) provided through bores 27 on top plate 70a to threaded bores in support posts 23a–b cast in base 22.

Actuator assemblies $34_{1-2}$ have individual access times of 12 msec. However, using two actuators to simultaneously access a single track reduces the access time by a factor approximately equal to the square root of two. Thus, the access time for disk drive 20 having two actuator assemblies $34_{1-2}$ acting to simultaneously access a single track is approximately 8.5 msec. Likewise, using actuators $34_{1-2}$ independently reduces the access times by one-half, thus yielding an access time of approximately 6.0 msec. Actuators $34_{1-2}$ pivot about axis $49_{1-2}$, respectively. Axis $49_{1-2}$ have been repositioned 5° counterclockwise relative to spin motor 32 from the location of the actuators disclosed in the parent application, Ser. No. 07/431,575. This move allows for an improved relationship of actuators $34_{1-2}$ to cover 24; specifically, this move provides actuator subarms 64a and 64b at relatively equidistant points from cover 24 when the actuator is positioned at outer diameter 78 and inner diameter 76, respectively. In addition, this move has allowed over 10% more copper wire to be provided in coil 62. Thus axis $49_{1-2}$ are a distance x from the end of base 22 of 1.69 inches and a distance y from the side of base 22 of 1.93 inches.

Read/write flex circuits $74_{1-2}$ are connected to respective headers $38_{1-2}$ and carry electrical signals from each header $38_{1-2}$ to the corresponding actuator assembly $34_{1-2}$. A spin motor flex circuit 33 carries electrical power from header $38_1$ to spin motor 32. The service loop of each read/write flex circuit $74_{1-2}$ is designed to exert only a minimal amount of rotational force (torque) on actuator body 56. Any torque exerted on actuator body 56 by any means other than the voice coil motor affects the function of actuator assembly 34 in positioning heads 46, 47 with respect to disks 44, particularly the track following and seek functions described in co-pending applications, Ser. Nos. 057,806 and 058,289. Thus, any torques created by the voice coil motor must be controlled to compensate for the force exerted by the read/write flex circuit $74_{1-2}$.

Each read/write flex circuit $74_{1-2}$ may be separated into three portions; a first portion carrying current to actuator coil 62 and a second portion which is a ground plane separating the current carrying portion from a third data carrying portion. The data carrying portion transfers signals between heads 46, 47 and PCB 36, via header 38. The ground plane prevents interference with the relatively weak data signals which would otherwise be caused by the larger currents necessary for actuator coil 62 passing through the first portion of the read/write flex circuit $74_{1-2}$.

Figures 7, 8:
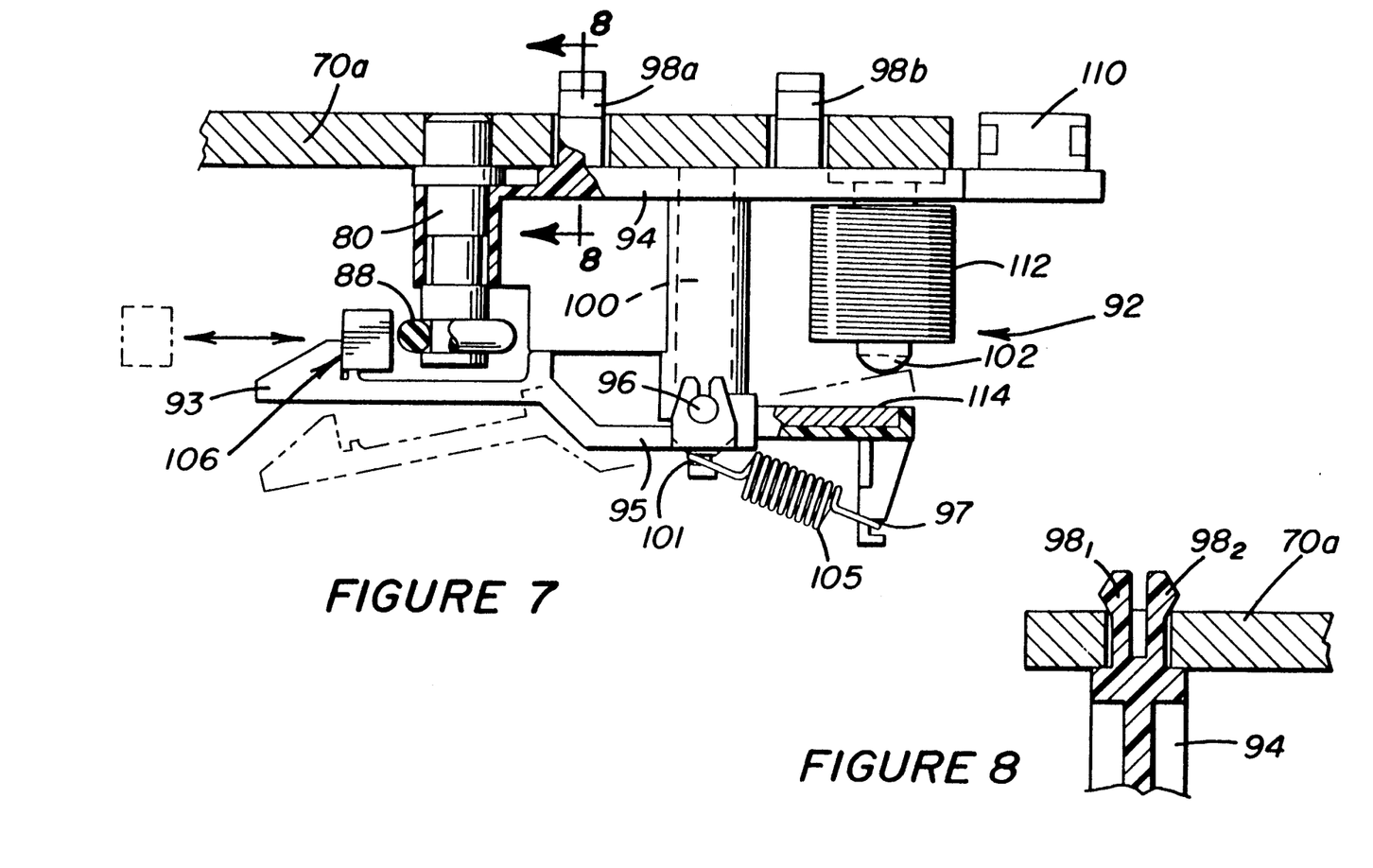
FIG. 7 is an assembled side view of the parking device utilized in accordance with the disk drive o the present invention.
FIG. 8 is a cross-sectional view along line 8—8 in FIG. 7.

As shown in FIGS. 2 and 4, crash stops are provided to limit the pivoting movement of actuator body 56 so that heads 46, 47 travel only between the inside and outside diameters 76, 78 of disks 44. The outside diameter crash stop comprises an eccentric element 73, having a compliant sleeve positioned thereabout formed of, for example, SUPERTUFF nylon. Head 73a is positioned flush with the top surface of top plate 70a through bore 82. When the pivoting motion of actuator body 56 places heads 46, 47 at the outside diameter 78 of disks 44, first crash tab 84 provided on sub-arm 64a of actuator body 56 contacts the compliant sleeve on eccentric element 82, thereby preventing movement of the heads 46, 47 beyond the outside diameter 78. If adjustment of the outside diameter crash stop is desired, eccentric element 73 may be rotated about its axis to any number of desired positions thereby changing the effective outer crash stop position. To secure crash post 73 in position once adjustment has been completed, a screw (not shown) is provided into head 73a thereby spreading the respective portions of head 73a engaging the sides of bore 82. The inside diameter crash stop comprises an O-ring 88 provided on crash post 80. Crash post 80, preferably fabricated of stainless steel, extends through latch body 94 and mounts in bore 80a in top late 70a (FIG. 7). Subarm 64b contacts O-ring 88 to limit the movement of heads 46, 47 beyond the inside diameter 76. The inside diameter crash stop is associated with parking means 92 so as to increase the usable number of tracks.

A parking device 92 (FIGS. 4, 5 and 5A) for parking the heads 46, 47 i.e., latching the actuator body 56 in an orientation where heads 46, 47 are positioned, for example, at the inside diameter 76 of disks 44, is provided for each actuator assembly $34_{1-2}$. Parking device 92 moves between a latched position, in which parking device 92 engages and latches actuator body 56, and an unlatched position, in which the parking device 92 is clear of the actuator body 56.

Parking device 92 includes a latch body 94 and a rocker arm 95, pivotally mounted to body 94, for example, by pins 96 molded into latch body 94. Latch body 94 and rocker arm 95 are preferably fabricated from SUPERTUFF nylon, or equivalent material. Rocker arm 95 engages body 94 in a snap-fit fashion so as to be rotatable about pins 96. Spring shaft 100 slidably mounts in body 94 and includes notch 101 for securing a spring 105. Spring 105 is also secured to a second notch 97 in arm 95. Arm 95 has a third notch 106 which hooks a portion of actuator arm 64b to latch actuator 34. Arm 95 also includes a ramp portion adjacent notch 106. A latch coil pin 102 supports a latch coil 112. A latch bar (or latch return) 114 is seated in arm 95. Spring shaft 100, latch coil pin 102 and latch bar 114 are formed of magnetically permeable material, such as nickel plated steel. Rocker arm 95, including all of the components attached thereto, is precisely balanced about the pivot points provided by pins 96. Parking device 92 is thus less susceptible to linear shock and vibration, and minimum amounts of force, and a minimum of electrical current in latch coil 112 is thus required to pivot latch arm 95.

A biasing force is provided by spring 105 which attracts arm 95 into the latched position shown in FIG. 7. A latch member 65 is provided on actuator subarm $64b$ which may be hooked by arm 95 to latch actuator 34. This biasing force of spring 105 holds latch arm 95 in the latched position so that latch arm 95 engages latch member 65 to park actuator body 56. Passing a current in the appropriate direction in latch coil 112 creates a force which attracts latch bar 114 nested in arm 95 and rotates latch arm 95 so that notch 106 swings away from latch member 65. A latch flex circuit (not shown) carries current to latch coil 112 from header 38 via a plug-in receptacle 110.

When power to disk drive 20 is off, the actuator body 56 is positioned so that latch member 65 abuts O-ring 88 on crash post 80 and latch arm 95 engages latch member 65. Any rotation of actuator body 56 away from post 80 is withheld by notch 106. Accordingly, parking device 92 reliably maintains the actuator body 56 in the latched position. When drive 20 is activated, a current is provided in coil 112 and actuator body 56 is rotated such that member 65 may move away from post 80. Preferably current in the coil remains on during operation of the drive. Should power for any reason be removed, arm 95 will return to the latched position under the biasing force provided by spring 105. When parking of the actuator is desired, PCB 36 directs actuator 34 to position the heads over the landing zone, at the innermost diameter 76, and power to the coil is removed allowing member 65 to engage notch 106. If power is unintentionally removed from coil 112, the force of movement of actuator body 56 and member 65 against ramp portion 93 forces arm 95 down and will allow member 65 to engage notch 106.

Two parking devices 92 are used in drive 20 and are secured to respective top plates $70a$ of actuators $34_1$, $34_2$ by mounting pins $98_{a-b}$. Pins $98_{a-b}$ include forked subarms $98_{1,2}$ having oppositely oriented ramp portions which allow pins $98_{a-b}$ to press-fit into bores $99_{a-b}$, respectively, and look in place as detailed in FIG. 5A.

The use of latch coil 112 provides a relatively low power parking device which is highly reliable. Although some residual magnetism is present in the magnetic circuit formed by spring shaft 100, latch coil pin 102, top plate $70a$, and latch bar 114, the curved shape of coil pin 102 which contacts latch bar 114 significantly reduces the effect to the residual magnetism and such is easily overcome by spring 105.

The control circuitry implemented on PCB 36 is described in co-pending patent application Ser. No. 07/611,141, filed coincident with the instant application. This disclosure has been incorporated by reference as set forth above.

Disk drive 20 also provides for improved writing of embedded servo information on disks $44_{a-e}$. Cover plate 30 includes two arcuate shaped ports $86_{a-b}$ to allow embedded servo information to be written onto disks $44_{a-e}$ while cover plate 30 is secured to base 22. The provision for writing of embedded servo information (or "pack-writing") through the cover plate in the instant disk drive results in reduced mechanical off-tracking errors that may result from torquing of the drive mechanics subsequent to writing of the servo information with the cover off. Such off-tracking can be a more significant problem in drives utilizing a flat-base plate design because of the inherent lack of structural rigidity in such a base plate.

In the preferred servo writing process of the present invention, one actuator is utilized to provide embedded servo information to disks $44_{a-e}$. Either actuator $34_{1-2}$ can be utilized to perform the pack-writing process. By way of example, a step member (not shown) is inserted through port $86a$ to engage a portion of actuator body 56. Slots $88a-b$, oppositely oriented on cover plate 30, allows an external clock read/write head, mounted on a transport arm, to access one of disks $44_{a-e}$ to determine the speed of rotation of disks $44_{a-e}$ during the writing process. To pack write the drive, a control system is linked to header assembly $38_2$. The pack write control system provides write control signals to heads $47_{a-j}$ to utilize actuators $34_2$ to write the servo information on disks $44_{a-e}$. In addition, the control system provides current to actuators $34_2$ to provide a reverse bias against the step member engaged with actuator body 56. The pack-write control system also provides current to spindle motor 32 to rotate disks $44_{a-e}$ during the writing process.

The clock read/write head initially writes a clock track outside the usable data field of one of the disks $44_{a-e}$, preferably at the outermost diameter track of the disks. As disks $44_{a-e}$ are rotated, the clock head continuously reads the clock track to determine the precise rotational velocity of disks $44_{a-e}$. The pack write control system determines the precise number of sectors to be utilized per track and direct actuators 34 to write servo information to each sector in accordance with the desired servo control scheme.

The step member, also under control of the pack write control system, controls movement of actuator $34_2$ at the desired rate to provide the servo information on each track as desired. Operation of the stepper member and the write process may be coordinated on any number of direct formats to utilize any number of closed-loop schemes. In addition, it will be recognized at the above mentioned pack-writing scheme using may be performed equally as well with port $86a$, actuator $34_1$ and header $38_2$. In addition, the provision of ports $86_{a-b}$ and $88_{a-b}$ in a symmetrical relationship assures that cover plate 30 is oriented correctly on base 22.

Also provided in cover plate 30 are windows $84_{a-b}$ allowing for manual adjustment of the outside diameter crash stop, described above.

Tables 1 and 2 below specify certain characteristics of disk drive 20.

TABLE 1

| | |
|---|---|
| Number of Disks | 5 |
| Number of Data Surfaces | 10 |
| Number Data Cylinders (Tracks per surface) | 2034 cylinders |
| Sectors per Track | 50 sectors |
| Bytes per Sector | 667 bytes |
| Data Bytes per Sector | 512 bytes |
| Data Capacity per Data Surface (formatted) | 50 Mbytes |
| Total Data Capacity (formatted) | 500 Mbytes |

TABLE 2

| | | |
|---|---|---|
| Disk Diameter | 95 | millimeters |
| | 3.74 | inches |
| Data Track Band Width | 20.32 | millimeters |
| | 0.8 | inches |
| Track Density | 2347 | tracks/inch |
| Bit Density (max) | 29–30K | fci |
| Head Width | 7.5 | microns |

TABLE 2-continued

| Track Width | 10.8 microns |
| --- | --- |

The high track density utilized in the preferred embodiment, i.e., approximately 2300-2400 tpi, is made possible, in part, by the low flying height of heads 46, 47. The heads 46, 47 fly at 5 micro-inches which allows the bit density of disks 44 to be at least as high as 29,000 fci. The increased bit density reduces the size (in degrees) of each sector, thereby providing more sectors and more servo bursts per track. Tighter track following is provided by the more frequent servo bursts. Using a fixed, standard disk rotational speed of 3600 rpm, a larger number of sectors per track increases the data transfer rate. In the disk drive of the present invention, each head reads bits at a rate of 16 $MH_2$. For two heads 32 Mbits per second or 4 Mbytes per second are read. Thus, the maximum data transfer rate is approximately 4 Mbytes/sec.

The many features and advantages of the disk drive of the present invention will be apparent to those skilled in the art from the description of the preferred embodiments and the drawings. The disk drive described herein provides a high-speed, low-power, compact disk drive suitable for use in work stations and other high performance applications. Numerous variations are possible as will be apparent to those skilled in the art; such variations are intended to be within the scope of the invention as defined by this specification and the following claims are intended to cover all the modifications and equivalents falling within the scope of the invention.

We claim:

1. A disk drive, comprising:
   a housing, including
      a flat base plate,
      a cover engaging said base plate to form a controlled environment therebetween, and
      a shock frame, coupled to said base plate;
   at least one disk having a first and second sides, each side including a plurality of tracks for storing data, wherein said housing includes seated gaskets providing a controlled environment isolated from ambient atmospheric conditions, and said at least one disk is provided in said controlled environment;
   means for mounting said at least one disk in said housing and for rotating said disk;
   at least four transducers for interacting with said at least one disk to read data from and record data on said tracks;
   first means for supporting and positioning a first and second ones of said transducers adjacent to said first and second sides of said at least one disk;
   second means for supporting and positioning a third and fourth ones of said transducers adjacent to said first and second sides of said at least one disk; and
   third means for controlling said first and second means to position said transducers over selected ones of said tracks to read and write data on each side of said disk.

2. A disk drive according to claim 1, wherein:
   said tracks store servo information and data; and
   said third means controls said first and second means in response to said servo information.

3. A disk drive according to claim 1, wherein said housing further includes a cover plate, surrounding said at least one disk, secured to said base and said first and second means, for providing structural rigidity for the disk drive.

4. A disk drive, comprising:
   a sealed housing providing a controlled environment isolated from ambient atmospheric conditions;
   a disk having a planar surface, said planar surface having a plurality of concentric tracks for storing data and servo information, said concentric tracks having a density of at least 1500 tracks per inch;
   means for mounting said disk in said sealed housing and for rotating said disk;
   two read/write heads for interacting with said disk to read and record data;
   two rotary, voice coil actuators mounted in said housing, said actuators supporting respective ones of said read/write heads adjacent to the data storage surface of said disk such that said heads have closely matched skew angles;
   a cover plate, surrounding said disk and within said controlled environment, coupled to said housing and to said actuators, and including at least two openings for allowing access to said disk and to at least one of said actuators, for providing embedded servo information on said disk; and
   means, responsive to the servo information, for controlling said actuators to position respective ones of said heads with respect to said disk so that each head reads data from and records data on all of the concentric tracks of the data storage surface.

5. A disk drive, comprising:
   a flat base;
   a cover attached to said base to create a controlled environment between said base and said cover;
   a plurality of disks in a disk stack, each disk having first and second data storage surfaces, each data storage surface having a plurality of concentric tracks for storing data and servo information;
   a spindle motor for rotating said disks, said spindle motor being attached to said base and to a top plate;
   a plurality of transducer means for reading data and embedded servo information from and recording data on respective ones of said disks;
   two actuators mounted on said base, said actuators supporting respective ones of said transducers adjacent to respective ones of the first and second data storage surfaces of each of said disks;
   a cover plate, attached to said base and said actuators, surrounding said disk stack, and including at least first and second conduits, said first conduit for allowing access to said disks by an external clock head and said second conduit for allowing access to one of said actuators; and
   control means, responsive to the servo information, for controlling said actuators to position said transducers with respect to said disks so that each transducer reads and records data on all of the concentric tracks of the data storage surface with which the transducer is associated.

6. A disk drive according to claim 5, wherein each said data storage surface has an inside diameter, further comprising means for parking said actuators so that each said transducer is positioned at the inside diameter of the corresponding data storage surface.

7. A multiple actuator disk drive having a horizontal data storage format, comprising:
   a housing, including a flat base plate,
a disk cover surrounding said at least one disk,
a cover engaging said base plate to form a controlled
environment therebetween, and
a shock frame coupled to said base plate;
a plurality of disks, each disk having first and second surfaces for storing a plurality of data files in a plurality of concentric data storage tracks on said first and second surfaces, said data storage tracks having embedded servo fields;
means for mounting said disks in said housing and for rotating said disks;
a plurality of transducers for interacting with said disks to read data and the servo fields from and to record data on said concentric tracks;

voice coil actuator means, mounted in said housing, for supporting at least two of the plurality of transducers adjacent to respective ones of the first and second surface of each of said disks; and
control means, responsive to the servo fields, (i) for controlling said actuator means to independently position said first and second heads associated with each surface so that the both the first and second heads associated with each surface read data from and record data on all of the concentric tracks of said surface, and (ii) for controlling the recording of data so that data files are stored on the concentric tracks on one surface until all of the concentric tracks on the one the surface are filled with data and then stored on the concentric tracks of another surface.

* * * * *

UNITED STATES PATENT AND TRADEMARK OFFICE
CERTIFICATE OF CORRECTION

PATENT NO. : 5,293,282

DATED : March 8, 1994

INVENTOR(S) : Squires, et al.

It is certified that error appears in the above-identified patent and that said Letters Patent is hereby corrected as shown below:

Col. 1, line 23: 07/790/008 should be "07/790,008"

Col. 1, line 26: "are" should be "all"

Col. 1, line 34: "Filed" should be "filed"

Col. 1, line 36: "are" should be "all"

Col. 1, line 37: --and-- should be deleted

Col. 1, line 49: "RE-AD/WRITE" should be "READ/WRITE"

Col. 1, line 52: after --of-- before --now-- insert "Ser. No. 420,371, filed Oct. 12, 1989," and after --June 9, 1992-- delete "Ser. No. 420,371, filed Oct. 12, 1989"

Col. 2, line 35: --effect-- should be "affect"

Col. 5, line 8: "drive o" should be "drive of"

UNITED STATES PATENT AND TRADEMARK OFFICE
CERTIFICATE OF CORRECTION

PATENT NO. : 5,293,282
DATED : March 8, 1994
INVENTOR(S) : Squires, et al.

It is certified that error appears in the above-identified patent and that said Letters Patent is hereby corrected as shown below:

Col. 6, line 19: "$5_{1-4}$" should be "$51_{1-4}$"

Col. 6, line 20: "shook" should be "shock"

Col. 6, line 22: "Shook" should be "Shock"

Col. 6, line 26: "shook" should be "shock"

Col. 7, line 43: "34-2" should be "$34_{1-2}$"

Col. 7, line 47: --ill-- should be "will"

Col. 7, line 62: "pCB" should be "PCB"

Col. 10, line 35: "late" should be "plate"

Col. 11, line 43: "look" should be "lock"

Col. 12, line 40: --at-- should be "that"

Col. 12, line 42: "$38_2$" should be "$38_1$"

Col. 12, line 40: delete "using"

UNITED STATES PATENT AND TRADEMARK OFFICE
CERTIFICATE OF CORRECTION

PATENT NO. : 5,293,282
DATED : March 8, 1994
INVENTOR(S) : Squires, et al.

It is certified that error appears in the above-identified patent and that said Letters Patent is hereby corrected as shown below:

Col. 13, line 17: "$MH_2$" should be "$MH_z$"

In the Claims

Col. 16, line 4: "surface" should be "surfaces"

Col. 16, line 14: delete --one the--

Signed and Sealed this

Eighteenth Day of October, 1994

Attest:

BRUCE LEHMAN

Attesting Officer     Commissioner of Patents and Trademarks